United States Patent [19]

Thompson

[11] Patent Number: 4,537,152
[45] Date of Patent: Aug. 27, 1985

[54] MILKING CLAW

[75] Inventor: Paul D. Thompson, Madison, Wis.

[73] Assignee: DEC International, Inc., Madison, Wis.

[21] Appl. No.: 616,115

[22] Filed: Jun. 1, 1984

[51] Int. Cl.³ .............................................. A01J 7/00
[52] U.S. Cl. .................................................. 119/14.54
[58] Field of Search .............. 119/14.54, 14.55, 14.36, 119/14.02, 14.14

[56] References Cited

U.S. PATENT DOCUMENTS

| 2,518,589 | 8/1950 | Anderson | 119/14.54 |
| 3,150,637 | 9/1964 | Fosnes | 119/14.54 |
| 3,762,371 | 10/1973 | Quayle et al. | 119/14.14 |
| 4,253,419 | 3/1981 | Yang | 119/14.54 |

Primary Examiner—Hugh R. Chamblee
Attorney, Agent, or Firm—Bayard H. Michael

[57] ABSTRACT

The milk claw has a frusto-conical cover fitting on and oriented to the bowl. The four inlets to the cover are downwardly and tangentially arranged on the cover so incoming milk hugs the inside wall of the cover as it swirls around the cover for discharge into the bowl. The bowl has a downwardly spiraled path leading to the outlet arranged on a radius of the bowl. A dam separates the start of the spiral path in the bowl from the outlet and serves to prevent the flow at the outlet from interfering with the flow entering the bowl.

4 Claims, 5 Drawing Figures

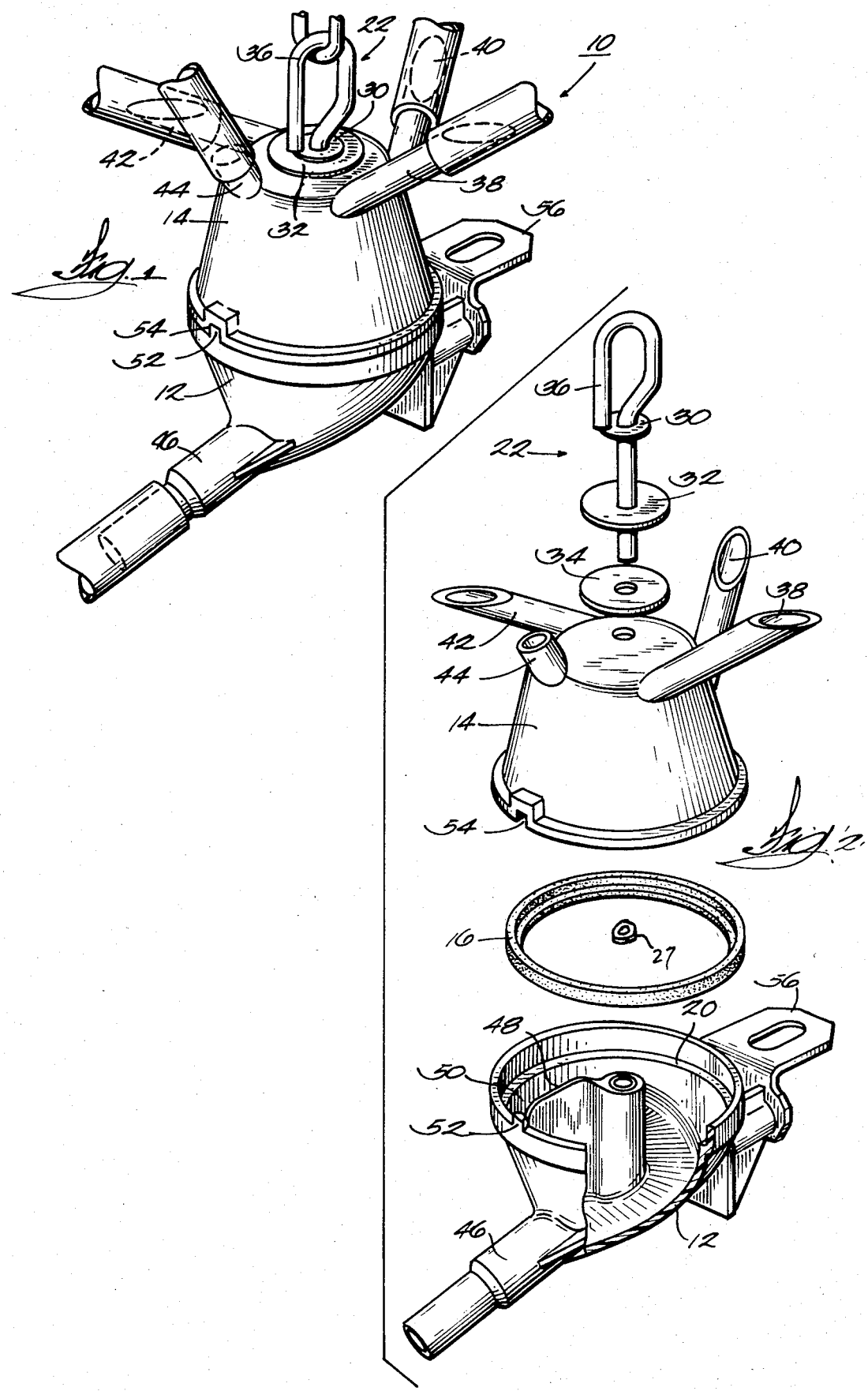

MILKING CLAW

BACKGROUND OF THE INVENTION

This invention relates to a milking claw which is a closed container in which milk from the four teat cups is received and discharged through a single tube to the collection point. It is desireable to reduce foaming in the claw because foam, a result of the incorporation of air into the milk, causes off-flavors and also may render a downstream meter, if used, inaccurate which means the production records will be faulted. It is desireable that any blow back in the discharge line not be able to cause blow back in the line to a teat cup which could cause the teat to be washed or impacted with milk from an infected teat with possible spread of infection. Similarly, the prior art claws frequently positioned the inlet nipples so there could be flow from one to another. Many claws cause pooling of the milk in the claw, i.e., slow down the milk causing loss of kinetic energy or fail to drain completely, causing subsequent spillage of milk. This results in requiring a higher vacuum to move the milk from the claw. That requires more energy and also causes increased and irregular vacuum pulsation on the teats which renders the teats more prone to mastitis.

Attention is directed to U.S. Pat. No. 4,253,419.

SUMMARY OF THE INVENTION

This invention seeks to solve the shortcomings of the prior art. This has been accomplished by providing a claw having a bowl and a cover having a frusto-conical interior with downwardly and tangentially arranged inlet nipples leading into the upper portion (small diameter) of the cover. This starts the milk downwardly on a swirling path of increasing diameter. This puts the incoming milk on a path which virtually precludes backing milk into a nipple other than that from which it came. The milk hugs the frusto-conical wall, avoiding free fall with consequent foaming and oxidation.

A further feature is to provide the claw with a bowl having a downwardly inclined spiral flow path of increasing cross-sectional area leading to a radially disposed outlet. A dam separates the start of the downwardly spiraled path and the outlet. The dam is generally parallel to the outlet axis. The flow path and dam cooperate to direct the incoming milk to the outlet in a very efficient manner conserving the kinetic energy of the incoming milk. The outlet is at the low point of the flow path so the claw can be tilted substantially without affecting the continuity of flow. The claw normally won't be tilted so much that milk is pooled rather than flowing continuously to the outlet. Therefore, the vacuum requirements are minimized, pulsation of the milking vacuum is reduced, and spillage of milk from the claw is minimized.

A further feature is the radial disposition of the outlet leading into the above mentioned spiral flow path. Should there be a blow-back of milk from the outlet, the milk enters the bowl through the outlet. The kinetic energy of this milk is dissipated as it is directed generally upward and into a path of decreasing cross-section, limiting its ability to reach any of the inlets. Any blow back in the outlet is unlikely to reach any inlet. The possibility of blow-back is further reduced by the frusto-conical geometry of the cover; any milk moving in a circumferential path within the cover tends to remain in or move to the lower portion of the cover because of the combined actions of gravity and the downward component of the reaction force of the wall on milk. The radial disposition of the outlet serves to balance the forces on the claw due to the weight of the outlet hose so the weight is not borne by two teats only.

Still another feature is the arrangement of the tangential downwardly inclined inlet nipples on a generally rectangular pattern around the cover. This permits using plastic hose (etc.) of substantially equal length while accommodating the fact a cow's teats are arranged in a generally rectangular pattern. This equalizes the weight on the teats and is much better for the cows. Patents such as U.S. Pat. No. 4,253,419, mentioned above, arrange the nipples in a square which will inherently unbalance the loads on the teats.

BRIEF DESCRIPTION OF THE DRAWINGS

FIG. 1 is a perspective view from slightly above the claw.

FIG. 2 is an exploded perspective view from generally the same angle as in FIG. 1.

DETAILED DESCRIPTION OF THE DRAWINGS

Figure 3:
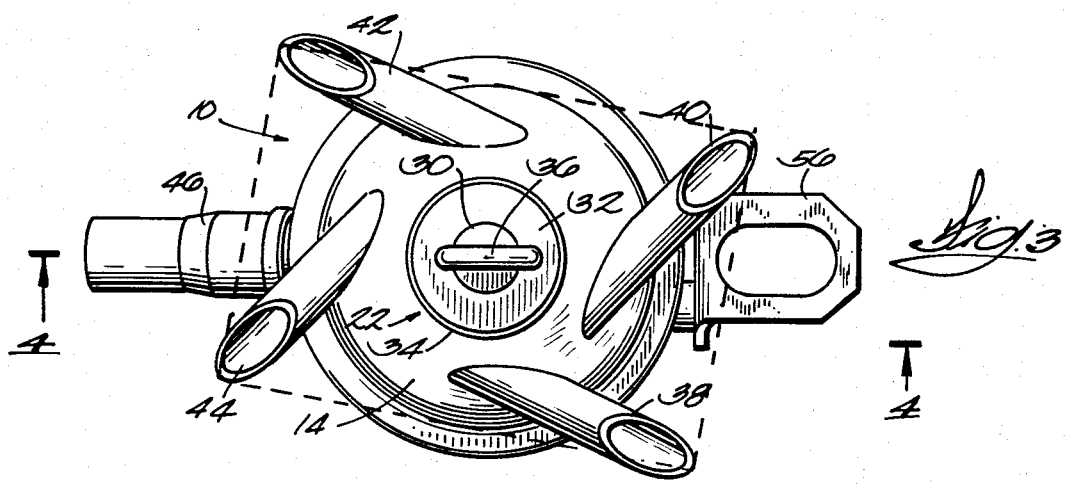
FIG. 3 is a top plan view of the claw.
Figure 4:
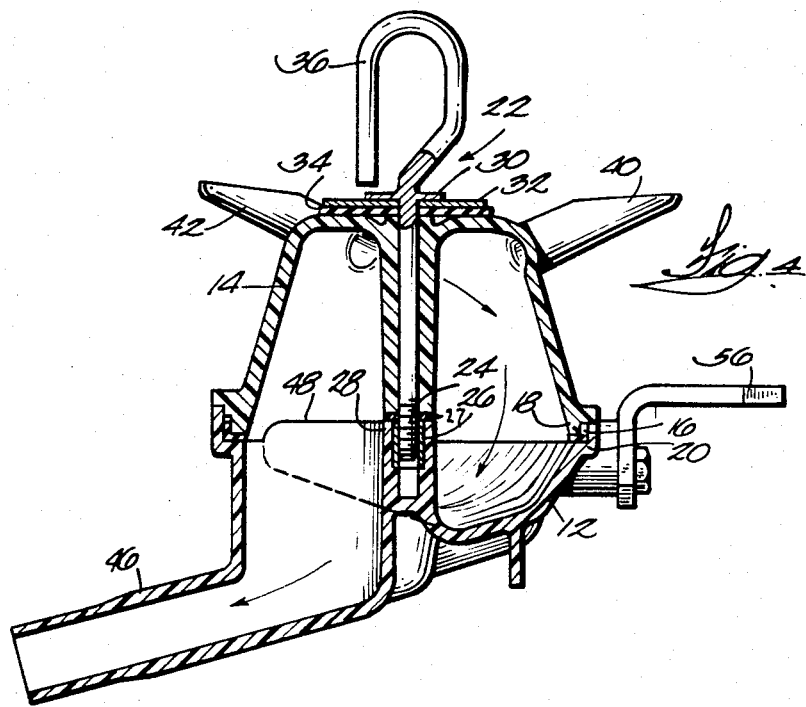
FIG. 4 is a vertical section on meandering line 4—4 in FIG. 3.
Figure 5:
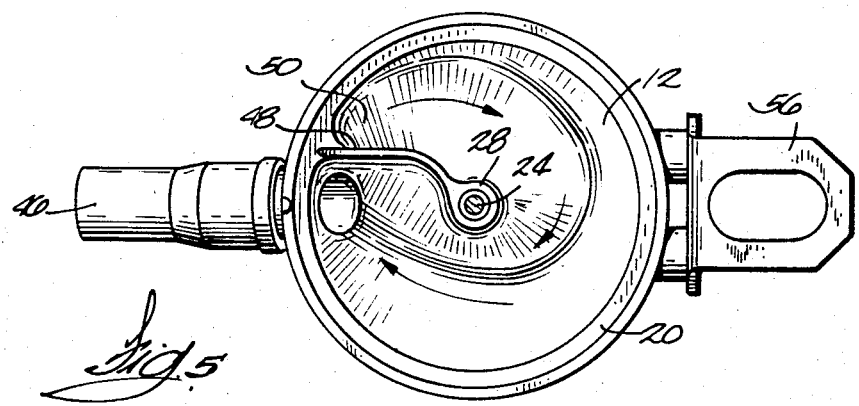
FIG. 5 is a plan view of the bowl of the claw.

The milking claw 10 includes a bowl 12 and a cover 14 which has the general shape of a frustrum of a cone with the large diameter of the frustrum being connected to the bowl with the gasket 16 interposed between the bottom 18 of the cover and the internal seat 20 provided at the top of the bowl. The gasket 16 has an inturned lip which lies between the cover and the bowl and is compressed as the connector 22 is tightened. It will be noted the connector has a threaded end 24 which extends through the central boss 25 of the cover and threads into a threaded sleeve 26 fixed in the central boss 28 in the bowl with gasket 27 captured between boss 25 and boss 28. The upper end of the connector 22 is provided with a washer 30 welded to the connector to overlie the loose washer 32 and gasket 34 so as to compress the gasket 34 against the top of the frusto-conical cover 14 when the connector is tightened. The upper end of the connector is shaped to provide a hanging eye 36.

The upper portion of the frusto-conical cover 14 is provided with four inlet nipples 38, 40, 42, 44. Each nipple is generally tangential to the wall of the cover 14 and is downwardly inclined. With this arrangement, milk entering the nipples will be started downwardly on a path hugging the wall of the frusto-conical cover and cause the milk to swirl about the axis of the cover and bowl rather than dropping into the bowl and foaming. This swirling action in a downward and radially expanding path, coupled with the downward spiral of increasing cross-section in the bowl 12, virtually precludes the possibility of milk being blown back into a nipple other than the one from which the milk came.

It will be noted that the inlet 44 is above and in the same vertical plane as the center of the discharge fitting or outlet 46 leading radially out of the bowl. The outlet leads from the low point in the bowl.

It will be noted that the inlet nipples 38, 40 are closer to each other than they are to inlet nipples 42, 44. As a matter of fact, the inlets intersect the frusto-conical cover generally in a rectangular arrangement as can be seen in dotted lines in FIG. 3. This generally rectangular configuration accommodates the natural arrangement of a cow's teats. They are not arranged in a square pattern, but they are, instead, in a rectangular pattern. This, therefore, permits the hoses connecting the teat cups to the inlets to the milking claw to be of equal length to assure equal weight on each of the four teats of the cow rather than causing unequal weight on the teats as is common in the prior art where the nipples are arranged in a square pattern.

The interior of the bowl 12 is molded to accommodate and provide an extension of the downward swirling action of the milk. Thus, from the central boss 28 of the bowl there is a dam 48 which runs generally parallel to the outlet 46. The dam runs out to the outer wall of the bowl. Looking downwardly on the bowl, the area immediately to the right and in a clockwise direction from the area 50 is relatively shallow and the floor of the bowl sweeps downwardly in a spiral fashion as can be seen clearly in FIG. 2. Thus, the downwardly spiraling configuration of the bowl provides an increasing cross-sectional area accommodating the increasing volume of milk likely to be in the flow path as the outlet 46 is approached. The dam 48 deflects the milk from the low point into the outlet 46. The outlet is so low relative to the rest of the floor or bottom of the bowl that pooling is virtually precluded. The milk keeps moving continuously from the inlet down through the spiraling path on the interior wall of the cover and into the bowl which guides the milk over a further spiraling path into the outlet. The milk is kept in motion and kinetic energy is preserved. Therefore, the amount of energy (vacuum) necessary to be applied to the system is kept at a minimum.

Orientation of the inlet 44 relative to the outlet 46 is assured by providing the bowl with the upstanding key or lug 52 which engages the corresponding notch 54 in the frusto-conical cover to orient the parts. If other orientations of outlet to inlet were desired, as for example in the event it were desired to have the outlet directed to the side rather than to the rear of the cow, key or lug 52 could be omitted or relocated. It is thus much easier to change the orientation of the outlet with respect to the cow, and thereby to accommodate varying arrangements at the milking barn, with this claw than with previous designs.

The bowl is provided with a hanger bracket 56. The bowl is molded out of plastic. This makes it possible to obtain the downward spiraled flow path at reasonable cost. Preferably, the cover is clear plastic to allow observation of the milk.

I claim:

1. A milking claw having a bowl and a cover meeting at a generally circular connection,
   said cover having a frusto-conical shape with the lower, larger diameter portion connected to said bowl, four inlet nipples connected to the upper side wall of said cover,
   each inlet nipple extending upwardly and outwardly from the sloping side wall of the cover generally tangential to said side wall so the incoming milk is downwardly directed and introduced to the interior of the cover in a tangential manner and swirls down and around the sloping inside of said cover on a path having an increasing diameter causing the milk velocity to decrease,
   and an outlet from said bowl positioned below said inlet nipples and receiving the milk after its velocity has decreased, any tendency of the milk to flow back to said nipples from said outlet requiring lifting and accelerating the milk.

2. A milking claw according to claim 1 in which said bowl is generally circular in plan view and said outlet is approximately on an extended radius of the bowl, the bottom of said bowl being shaped to provide a downwardly inclined spiral flow path, said spiral flow path leading from a high point at one end of said spiral flow path to a low point at said outlet and continuing the downwardly swirling flow of milk from said cover, said high and low points being circumferentially adjacent.

3. A milking claw according to claim 2 including a dam originating approximately at the center of said bowl and curving outwardly to a straight portion generally parallel to said extended radius, said dam being between and separating the start of said downwardly inclined spiral flow path in said bowl from said outlet.

4. A milking claw according to claim 3 in which said inlet nipples are paired with the nipples of a pair being closer to each other than they are to the nipples of the other pair and the outer ends of the nipples lie in a common plane and are arranged in a rectangle having long and short sides.

* * * * *